US005911213A

United States Patent [19]

Ahlborn et al.

[11] Patent Number: 5,911,213

[45] Date of Patent: Jun. 15, 1999

[54] PROCESS FOR OPERATING AN ELECTRIC FILTER FOR A CRANKCASE VENTILATOR

[75] Inventors: Stephan Ahlborn, Senden; Gert Krausse, Münster, both of Germany

[73] Assignee: Firma Ing. Walter Hengst GmbH & Co. KG, Münster, Germany

[21] Appl. No.: 09/011,574

[22] PCT Filed: Jul. 15, 1996

[86] PCT No.: PCT/DE96/01325

§ 371 Date: Feb. 10, 1998

§ 102(e) Date: Feb. 10, 1998

[87] PCT Pub. No.: WO97/06891

PCT Pub. Date: Feb. 27, 1997

[30] Foreign Application Priority Data

Aug. 12, 1995 [DE] Germany ........................... 195 29 769

[51] Int. Cl.$^{6}$ ........................................ B01D 50/00

[52] U.S. Cl. ........................................ 123/572

[58] Field of Search ........................ 123/572, 573, 123/574

[56] References Cited

U.S. PATENT DOCUMENTS

| | | | |
|---|---|---|---|
| 3,406,669 | 10/1968 | Edwards . | |
| 3,976,448 | 8/1976 | Eng et al. | 123/573 |
| 4,284,417 | 8/1981 | Reese et al. . | |
| 4,816,979 | 3/1989 | Domann et al. . | |

FOREIGN PATENT DOCUMENTS

| | | |
|---|---|---|
| 0 457 224 | 11/1991 | European Pat. Off. . |
| 41 40 228 | 6/1993 | Germany . |

*Primary Examiner*—Marguerite McMahon
*Attorney, Agent, or Firm*—Lahive & Cockfield, LLP

[57] ABSTRACT

The invention relates to a process for operating an electric filter for gaseous fluids containing impurities, especially in a crankcase ventilator for internal combustion engine, in which the electric filter is fitted in the ventilation aperture as an oil separator and the high-voltage generator and hence the power supplied thereby can be controlled or regulated depending on the residual impurity content attained or to be attained.

2 Claims, 1 Drawing Sheet

PROCESS FOR OPERATING AN ELECTRIC FILTER FOR A CRANKCASE VENTILATOR

Figure 1:
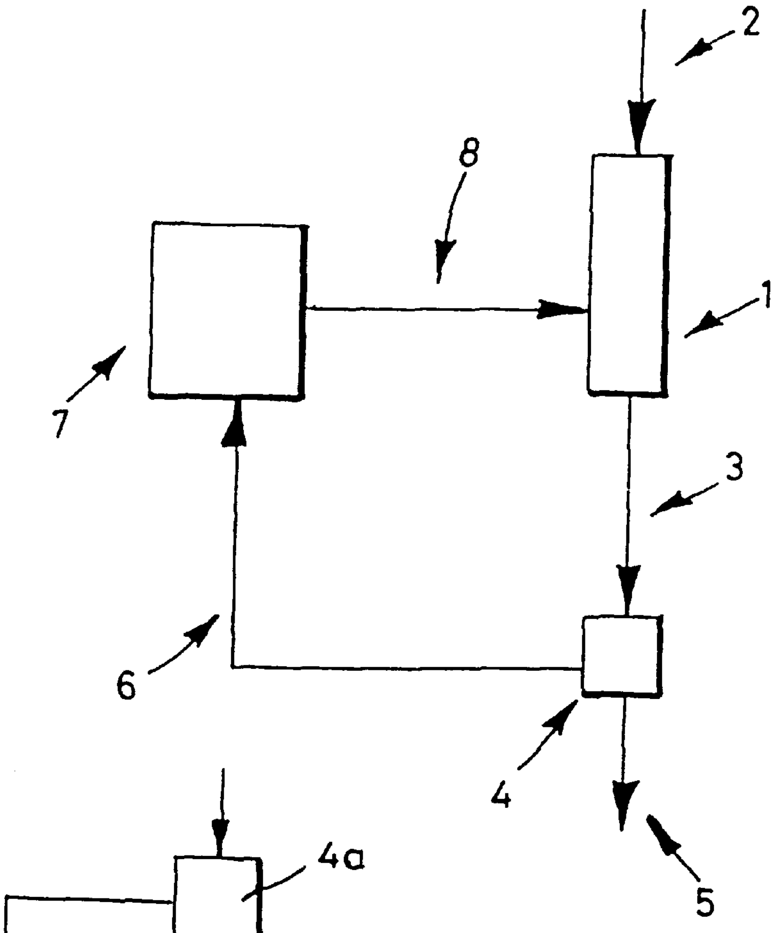

The invention relates to a method for operating an electrostatic filter in a crankcase ventilation system.

It is known from U.S. Pat. No. 3,406,669, constituting the species, to provide a crankcase ventilation system in which an electrostatic filter is inserted into the vent line of the crankcase, said filter scrubbing the ventilation gases which are then conducted to the intake line. The oil that is precipitated in the electrostatic filter, in other words on the collecting electrode, is collected in a collecting container in the known system and removed intermittently.

From both U.S. Pat. No. 4,284,417 and EB-A457224, it is known to control electrostatic filters operated at high voltage in gas- or coal-operated power plants continuously and automatically as a function of the degree of contamination of the exhaust gases flowing outward. Such a control has not previously been proposed in internal combustion engines, i.e. motor vehicles.

In practice, however, electrostatic filters have been employed to only a very slight degree in crankcase ventilation systems, probably because the heat generated by the electronic components of the high-voltage power supply is perceived as disadvantageous, with this heat simultaneously shortening the lifetime of the components. It also appears to be possible that a relatively high sparkover tendency prevails with the available high voltage, and the lifetime of the insulators that are absolutely necessary is also limited.

The goal of the invention is to adapt the operation of an electrostatic filter for a crankcase ventilation system of an internal combustion engine to the conditions prevailing here.

This goal which forms the basis of the invention is achieved by virtue of the fact that it is proposed that a control device be provided for high-voltage generation, said device processing the signals for engine rpm and/or power and/or temperature, in other words the vehicle data. This control device can also take into account the oil ejection characteristic map of the engine and the precipitation characteristic map of the electrostatic filter. This makes adjustments to the individual vehicle types and operating modes possible.

Embodiments of the invention will now be described with reference to the drawing.

Figure 2:
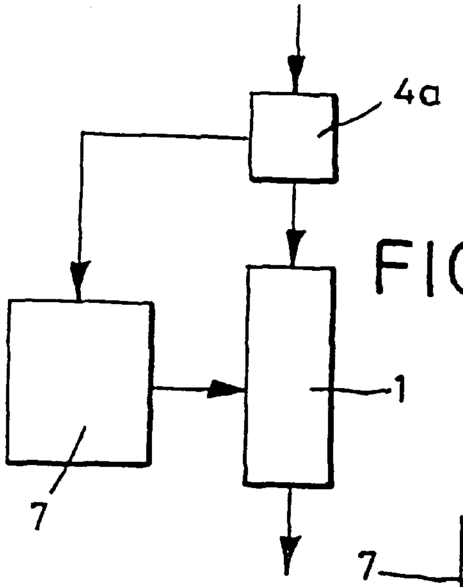
Figure 3:
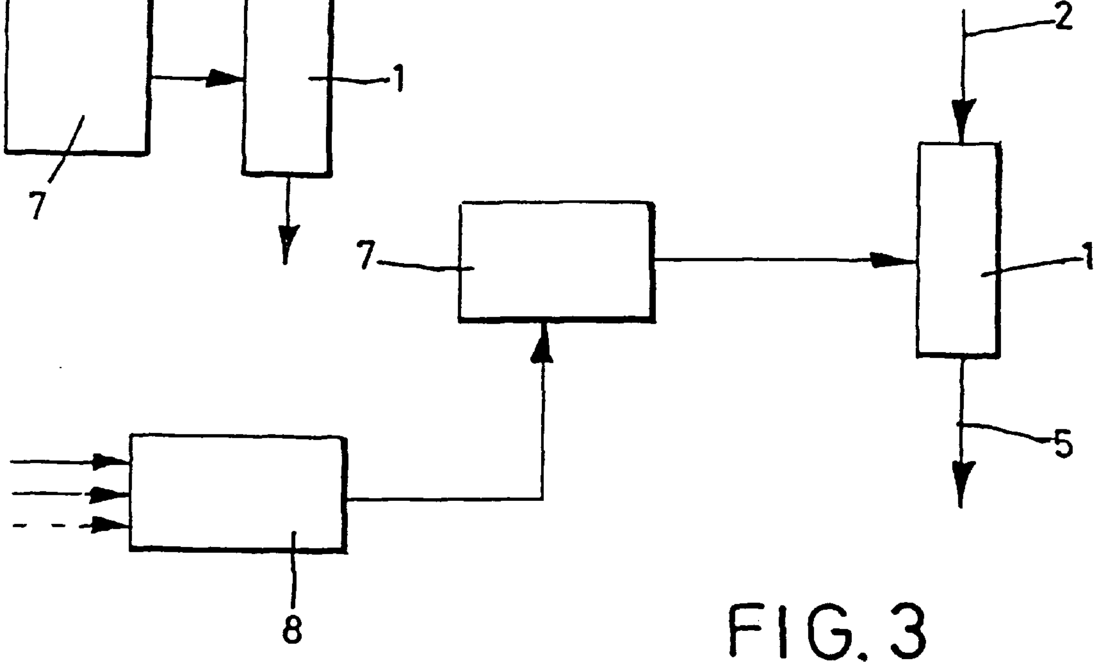

FIG. 1 is a schematic view, showing a circuit diagram of one possible regulation mode for the high-voltage power supply of the electrostatic filter, FIG. 2 is a schematic view in the form of a circuit diagram of a type of control that depends on the dirt content, and FIG. 3 is another schematic circuit diagram showing a possible mode of control in which engine characteristic curves control the high-voltage power supply.

In FIG. 1, 1 designates an electrostatic filter to which raw gas is supplied through a line 2. Electrostatic filter I is supplied with high voltage by a high-voltage power supply 7. The high voltage is applied to the discharge electrode so that oil particles with the gas collect thereon to purify the gas. The electrostatic filter hence functions as an oil separator the oil then flows through an oil discharge line and is either returned to the crankcase or routed to a collection vessel.

From the electrostatic filter 1, purified gas is fed through line 3 to a sensor 4, where the contamination level of the purified gas from the electrostatic filter is now determined. In correspondence with the residual contamination level, the high voltage supply unit 7 is now adjusted by way of lead 6; the high voltage is thus increased or decreased accordingly for adjusting the precipitation efficiency of the electrostatic filter. The purified gas discharge line is designated by 5; in the case of crankcase ventilation, this line leads to the intake line.

The design version indicated in FIG. 3 likewise includes an electrostatic filter 1, a raw gas line 2, and a purified gas line 5; the high voltage supply unit is also designated by 7. The high voltage supply unit 7 is regulated by a control unit 8, which takes the oil discharge characteristic of the engine and the precipitation characteristic of the electrostatic filter into account, and is controlled by the engine rotational speed, or power, or temperature, or any combination of same as variable input signals.

In the arrangement illustrated in FIG. 2, control is performed by a sensor 4*a* installed in the raw gas line.

We claim:

1. Method for crankcase ventilation for an internal combustion engine with a vent line into which an oil separator designed as an electrostatic filter (1) with a high voltage generator (7) is inserted, said method comprising the step of connecting a control device (8) that controls the performance of the electrostatic filter (1) upstream of the high-voltage generator (7), and connecting said control device for controlling the high-voltage generator (7) as a function of vehicle data.

2. Method according to claim 1, further comprising the step of operating the control device (8) as a function of an oil ejection characteristic map of the engine and a separation characteristic map of the electrostatic filter.

* * * * *